Dec. 1, 1936.    L. H. KAUPKE    2,062,578
PICKER ARM FOR POTATO PLANTERS
Filed June 5, 1935
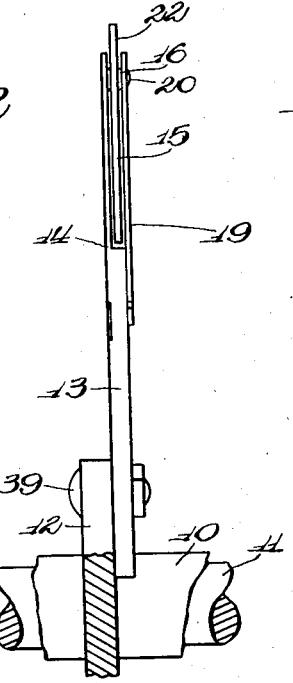
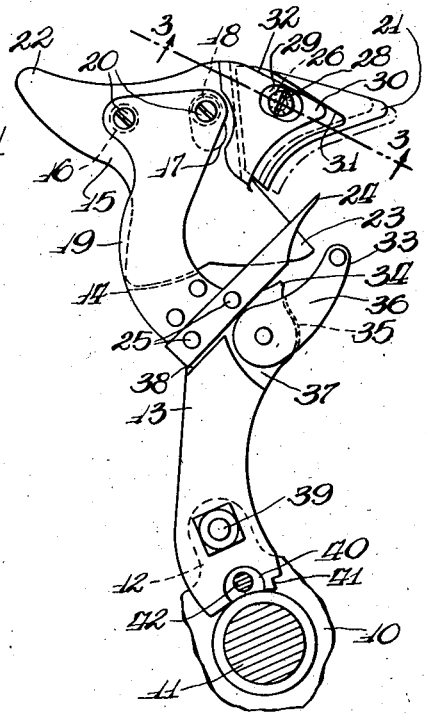
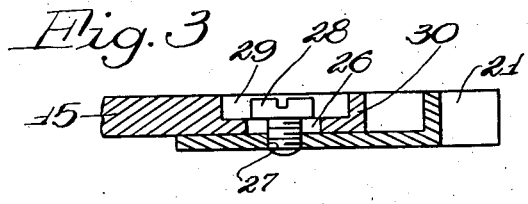
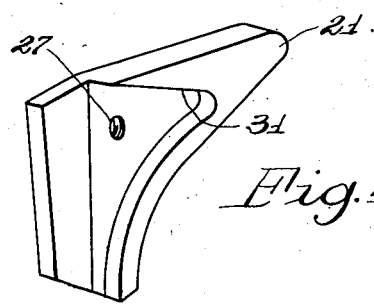
Inventor
Lee H. Kaupke
By P. F. Lavagne
Atty.

Patented Dec. 1, 1936

2,062,578

UNITED STATES PATENT OFFICE 2,062,578

PICKER ARM FOR POTATO PLANTERS

Lee H. Kaupke, Auburn, N. Y., assignor to International Harvester Company, a corporation of New Jersey Application June 5, 1935, Serial No. 25,042

5 Claims. (Cl. 221—133)

This invention relates to potato planters of the type in which a series of pickers is caused to revolve around a shaft over a receiver for potatoes, these pickers having prongs to empale a piece of seed potato, and slotted concaves arranged in the receiver to press the potatoes on the prongs. The pickers are then caused to release the piece of seed potato by striking against a knock-off bar, said seed being delivered to the ground. In such devices there is a means for opening a furrow wherever the seed potatoes are to fall, and another device for closing the furrow.

The chief difficulty in the proper feeding of potatoes is that, if they are not fed regularly, there is a wasting of the potatoes or else irregular planting, owing to too many or too few being deposited from the pickers. This type of picker arm and planter is best disclosed in the United States patent to C. A. A. Rand 1,583,008, granted May 4, 1926, and filed August 9, 1924.

The main object of the invention is to provide a picker arm adaptable to work with any size of seed cutting, and this is accomplished by providing the picker arm with a stripper plate, in which the finger portion of the stripper plate is adjustable for each size of seed, such as medium seed, large seed, and small seed, and also to increase the percentage of planting accuracy.

Another difficulty in feeding by means of a picker arm, as described in the patent previously referred to, is that the pickers in the past have not been adjustable as to the amount of projection of the pickers to empale the seed, so that, when small pieces of seed are desired, too many pieces would be delivered by the picks. It is an object of this invention to provide means for adjusting the amount of the protruding picks to avoid this difficulty by adjusting the finger portion of the stripper plate.

Another object of this invention is to provide means whereby the adjustable finger portion is adjusted relatively to the picking means and to the stripper portion of the stripping plate, to form an adjustable throat area between the pick and the finger portion, so that this throat area is adjustable for small, medium, and large seed.

In the accomplishment of the above objects and minor objects, which will hereinafter be more specifically described and then defined in the claims, the preferred form of the improved details of structure is illustrated in the accompanying drawing, wherein:

Figure 1 is a side elevation, showing the picker arm complete and mounted on the picker arm spider, showing the adjustable finger portion of the stripper plate with the finger portion shown in dotted lines for the small and large seed positions;

Figure 2 is a rear elevation of the picker arm and spider;

Figure 3 is a section along line 3—3 of Figure 1; and,

Figure 4 is a perspective view of the adjustable finger portion.

The invention is herein disclosed in combination with a potato planter as shown in the U. S. Patent No. 1,583,008 granted to C. A. A. Rand, May 4, 1926, in which the picker arm spider 10 is rotatably mounted on the rigid axle 11. The picker arm spider has lugs 12, to which is bolted the completed picker arm 13. The completed picker arm 13 comprises a bifurcated picker arm 14 with the potato stripper plate 15 movable in the bifurcated portion. The potato stripper plate 15 is pivoted about the pivot point 16 on the picker arm 14 and is limited in its movement by the slotted portion 17 of the stripper plate 15 engaging the stop 18 on the picker arm 14. In this manner the stripper plate may be swung from maximum open position by gravity to its engaging position over the seed when the seed is engaged by the concaves of the potato planter. The bifurcated portion of the picker arm, between which the stripper plate pivots, is formed by the upper portion of the picker arm 14 and the side plate 19, which may be removably secured to the picker arm 14 through the lugs 16 and 18 by the screws 20, or in the usual manner by rivets, securing the stripper plate 19 in the abutting position to the lugs 16 and 18. The forward portion of the stripper plate 15 has an enlarged finger engaging portion 21, as shown in Figure 2. The rear portion of the stripper plate 15 has a rearwardly extending heel piece 22, which engages the knock-off block on the potato planter when the seed is discharged to the seed shoe.

Integrally of the mid-portion of the stripper plate 15 is the stripper portion 23, which passes between the usual picks 24 secured on each side of the picker arm 14 by the rivets 25. The picks 24 extend beyond the stripper portion to empale the seed as the picker arm passes through the mass of seed in the hopper. The picker arm shown in Figure 1 illustrates the stripper plate 15 with the adjustable finger portion, which is used for medium size seed and is shown in the solid lines.

Figures 1, 3 and 4 show the adjustable finger portion 21, which is adjustably mounted on the stripper plate 15 by means of a slotted portion 26 in the stripper plate 15 and the threaded portion 27 of the finger portion 21, and the finger portion 21 adjustably secured to the stripper plate 15 by a screw 28 passing through the slotted portion of the stripper plate and threaded to the finger portion 21. A depressed portion 29 in the stripper plate 15 accommodates the screw head 28. The finger portion 21 is recessed, as best shown in Figure 3, and conforms to the guide portion 30 of the stripper plate 15. The edge 31 is adjustable along the edge 32 of the guide portion 30. The stripper portion 23 is so proportioned, as shown in Figure 1, to conform to the adjustable finger portion 21, so that an adjustable throat portion may be formed, in which the potato seed rests. It is thus seen that the picker arm, designed with the adjustable finger portion 21, may be so adjusted that the picker may be adjusted for the conditions most frequently met in the planting of seed potatoes. A thumb piece 33 is bifurcated at its lower end and pivotally connected to the picker arm 14, and it is limited in its movement as it passes through the seed in the hopper by the stop 34. As it passes through the seed, in the uppermost position of the picker arm, the thumb piece falls and is limited in its movement by the stop portion 35 of the thumb piece 33. The thumb piece 33 has an enlarged surface portion similar to that of the enlarged finger portion 21 of the stripper plate. The thumb piece 33 is pivotally connected by the bifurcated portion formed by the thumb piece casting and its side plate 36 to the reduced portion 37 of the picker arm 13. The thumb piece is used to prevent doubling; that is, the picking of more than one seed portion. The thumb piece may also act to steady the potato seed on the picks 24. The mid-portion 38 of the picker arm 13 is so proportioned that the picks 24 are symmetrically placed on each side of the stripper portion 23. The lower end of the picker arm 13 is secured to the lug 12 by the usual means of the carriage head bolt and nut 39, and the lower end of the picker arm is shaped to conform to the periphery of the spider 10. Cut-out portions 40 and 41 are located on the picker arm to accommodate the pawl rod 42 for the feed cam.

The number of these completed picker arms 13 ordinarily used is 6 or 8, depending upon the gearing and mechanism used for the various plant spacings. These completed picker arms are placed in two groups of three or four and laterally spaced on the spider.

In the operation of a potato planter, it will be understood that the picker arms are positioned to travel in slots of the concave between the sections of the magazine and that their action is to empale or pick seed potatoes as the individual arms pass through the mass of potatoes in the bottom of the magazine, lifting them up and around to the forward side of the magazine where the heel piece 22 of the stripper plate 15 strikes an abutment on the frame, causing the potatoes to be stripped from the prongs of the picks 24 by the stripper portion 23 of the stripper plate 15, and dropped. The thumb piece 33 is adapted to gauge the depth of the prongs when large seeds are used. The enlarged finger portion 21 acts to center the seed prior to empalement of the seed by the picks 24. The slot 17 limits the movement of the stripper plate 15. The picks 24 are laterally spaced and placed approximately one-half inch apart, so that the seed may be empaled without splitting the same and losing it from the pick as it travels through the mass of seed in the magazine of the potato planter.

It will be evident that there has been provided a picker arm for the spider of a potato planter, which may be readily connected to and disconnected from the spider and in which the adjustable finger portion of the stripper plate may be readily adjusted, so that small, medium, and large seeds may be planted without the necessity of changing over the entire picker arm, but by merely adjusting the finger portion of the stripper plate. It will be evident from this disclosure that means have been provided in which the accuracy of the usual planter, having the usual picker head, may be increased when a suitable stripper plate, accurately proportioned and with an adjustable finger portion thereon, may be readily adjusted with respect to each other for the size of the seed to be planted.

It is to be understood that materials suitable for the stresses encountered in a potato picker arm of this nature are to be used, and that the preferred embodiment of the invention herein described is capable of certain modifications without departure from the scope of the invention to be defined in the appended claims.

What is claimed is:

1. In a potato planter, the combination with a picker comprising a picker arm and picking means mounted on said picker arm adapted for spearing potato seed, of a stripper plate pivotally mounted on said picker arm comprising a stripper portion and a finger portion adjustably mounted with respect to the stripper portion, and means for adjusting the finger portion on the stripper plate, whereby the picker may be adjusted for sowing potato seeds of several sizes.

2. In a potato planter, the combination with a picker comprising a picker arm and picking means mounted on said picker arm adapted for spearing potato seed, of a stripper plate pivotally mounted on said picker arm comprising a stripper portion and a finger portion adjustably mounted with respect to the stripper portion, and said stripper portion complementarily shaped to the adjustable finger portion forming a throat portion, whereby the picker may be adjusted for sowing potato seeds of several sizes.

3. In a potato planter, the combination with a picker comprising a picker arm and picking means mounted on said picker arm adapted for spearing potato seed, of a stripper plate pivotally mounted on said picker arm comprising stripper portion and an adjustable finger portion, and means for adjusting the finger portion relative to the aforesaid picking means, whereby the picker may be adjusted for sowing potato seeds of several sizes.

4. In a potato planter, the combination with a picker comprising a picker arm and picking means mounted on said picker arm adapted for spearing potato seed, of a stripper plate pivotally mounted on said picker arm comprising a finger portion adjustably mounted with respect to the stripper portion, and means on the stripper plate for adjusting the adjustable finger portion whereby the picker may be adjusted for sowing potato seeds of several sizes.

5. In a potato planter, the combination with a picker comprising a picker arm and picking means mounted on said picker arm adapted for spearing potato seed, of a stripper plate pivotally mounted on said picker arm comprising a stripper portion and an adjustable finger portion, and means for adjusting the adjustable finger portion with respect to the stripper portion, said adjusting means comprising complementary guiding members on the stripper plate and the adjustable finger portion, and means for securing the finger portion in adjusted position relative to the stripper portion.

LEE H. KAUPKE.

CERTIFICATE OF CORRECTION.

Patent No. 2,062,578.                                                December 1, 1936.

LEE H. KAUPKE.

It is hereby certified that error appears in the printed specification of the above numbered patent requiring correction as follows: Page 2, second column, line 44, claim 3, after the word "comprising" insert a; and line 54, claim 4, after "comprising" insert a stripper portion and; and that the said Letters Patent should be read with these corrections therein that the same may conform to the record of the case in the Patent Office.

Signed and sealed this 16th day of February, A. D. 1937.

(Seal)
Henry Van Arsdale
Acting Commissioner of Patents.